Sept. 15, 1925.
M. MARTINOV
BAKING PAN
Filed Nov. 17, 1924
1,553,704
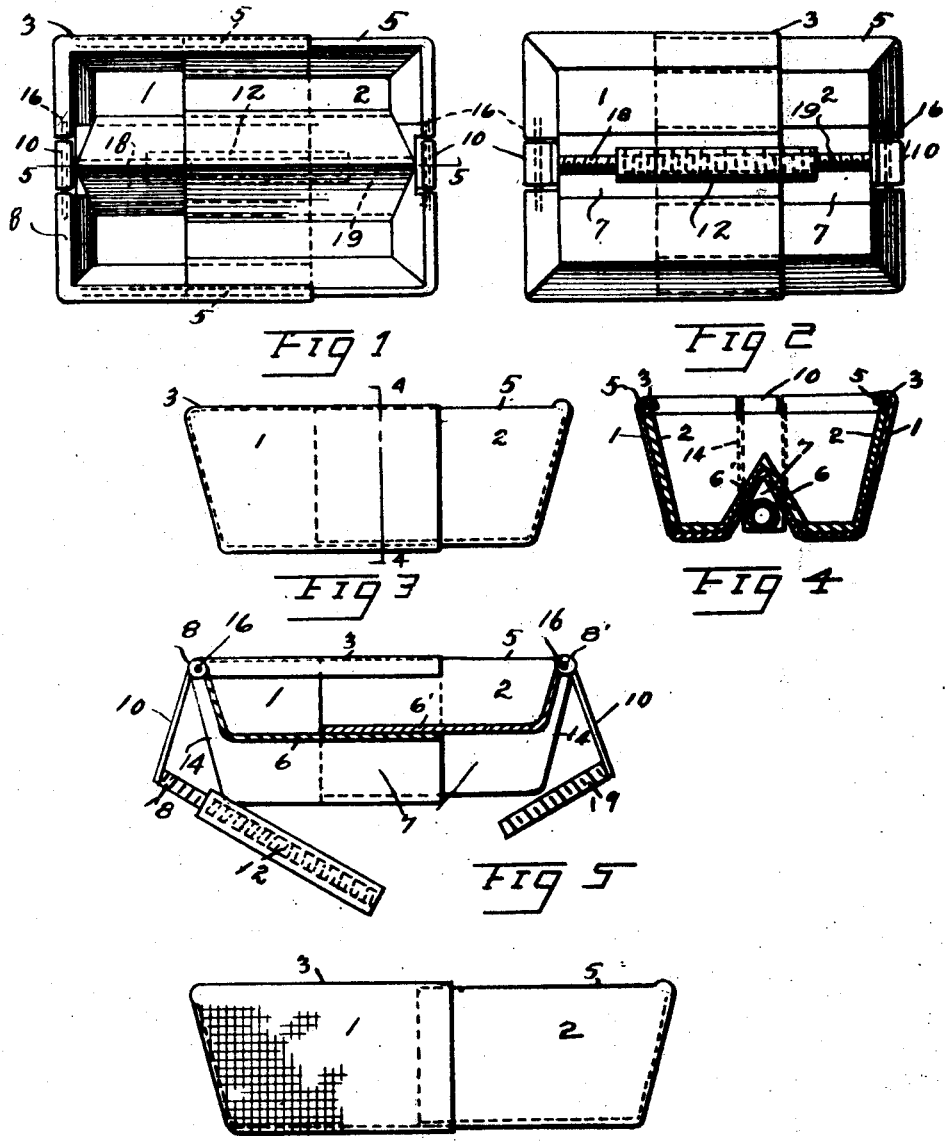

Patented Sept. 15, 1925.

1,553,704

UNITED STATES PATENT OFFICE.

MILIVOJ MARTINOV, OF SALT LAKE CITY, UTAH.

BAKING PAN.

Application filed November 17, 1924. Serial No. 750,319.

*To all whom it may concern:*

Be it known that I, MILIVOJ MARTINOV, a citizen of the United States, residing at Salt Lake City, in the county of Salt Lake and State of Utah, have invented a new and useful Improvement in Baking Pans, of which the following is a specification.

This invention relates to a baking pan to be used by bakers and house-wives in baking bread, cake and the like.

It is the object of this invention to provide a baking pan that can be made longer or shorter to fit the size of loaf desired to be baked, thus doing away with the several different lengths of pans now used.

It is also an object to provide a baking pan that can be constructed of tin, corrugated iron or screen netting in two sections and can be secured together in such a manner that the sections will not pull or come apart in moving them.

With these and other objects in view which will appear in the description of the invention, the invention resides in the combination and arrangements of parts and in the details of construction hereinafter described and claimed, it being understood that changes in the precise embodiment of invention herein disclosed can be made within the scope of what is claimed without departing from the spirit of the invention.

In the drawings—

Figure 1 is a plan view of my invention looking into the pan.
Fig. 2 is a bottom view of Fig. 1.
Fig. 3 is a side view of Fig. 1.
Fig. 4 is a section on line 4—4, Fig. 3.
Fig. 5 is a section on line 5—5, Fig. 1.
Fig. 6 is a view showing the two sections extended to the full length.

The invention is constructed of two sections known as the left section 1 and the right section 2. Section 2 telescoping into section 1. The binder 3 of section 1 is so constructed that the binder 5 of section 2 will telescope therein.

On the bottom of section 1 is formed a raised projection 6. A corresponding projection 6′ is formed on the bottom of section 2 in such a manner that it will fit over the projection 6 of section 1. The projections when so formed form a cavity 7 on the outside of the bottom of each section. On the end wall of each section is formed a groove 14. In this groove is placed the hinged end 10 of the turn-buckle 12. The end 10 being hinged to the binder at 8 and 8′ by the pin 16. The bolts 18 and 19 of the turn-buckle 12 are secured to the hinge by brazing them thereto.

Having described my invention I will now assemble the same.

After the pan sections have been bent to shape and secured to the binder or the binder bent thereon, I take the hinge 10 and place one in each of the grooves 14 and pivot them therein by the pins 16. Now take the sections and place them together in such a manner that section 2 will telescope section 1. Now place the bolts within the cavity 7 and then turn on the turnbuckle 12 to draw the sections together; now the invention is ready for use.

Having thus described my invention what I claim as new and desire to secure by Leters Patent is:

1. A bake pan of the character described, comprising two sections, one of said sections being constructed to telescope into the other of said sections; a turnbuckle pivotally connected to each of said sections to adjust the length of the pan, the bottoms of the sections being provided with means for receiving said turnbuckle, and means for holding said sections against relative vertical movement when said sections are in telescoped position.

2. A bake pan of the character described, comprising two sections, one of said sections being constructed to telescope into the other of said sections, a turnbuckle, the ends thereof being pivotally connected to said sections, each of said sections being provided with means for receiving said turnbuckle and means for holding said sections against relative vertical movement when said sections are in telescoped position.

3. A bake pan of the character described, comprising two sections, one of said sections being constructed to telescope the other of said sections, the edges of said sections having a binder thereon, the binder of one of said sections being constructed so the binder of the other of said sections will telescope therein, a turnbuckle pivotally connected to said sections to adjust the length of the pan, and means in the bottom of said sections to receive said turnbuckle.

4. A bake pan of the character described, comprising two sections, one of said sections being constructed to telescope into the other of said sections, a turnbuckle pivotally connected to said sections to adjust the length of the pan, and means for holding said sections against relative vertical movement when said sections are in a telescoped position.

5. A bake pan of the character described comprising two sections, one of said sections being constructed to telescope the other of said sections, a turnbuckle for regulating the length of the pan the ends thereof being pivotally connected to said pan, means in said pan for receiving said turnbuckle and means for holding said sections against relative vertical movement when said sections are in telescoped position.

In witness whereof I affix my signature.

MILIVOJ MARTINOV.